United States Patent
Chiu et al.

(10) Patent No.: US 9,201,614 B2
(45) Date of Patent: Dec. 1, 2015

(54) ANTI-TIMEOUT METHOD AND DATA PROCESSING SYSTEM

(71) Applicant: ASMedia Technology Inc., New Taipei (TW)

(72) Inventors: Ming-Hui Chiu, New Taipei (TW); Chia-Hsin Chen, New Taipei (TW)

(73) Assignee: ASMEDIA TECHNOLOGY INC., New Taipei (TW)

(*) Notice: Subject to any disclaimer, the term of this patent is extended or adjusted under 35 U.S.C. 154(b) by 50 days.

(21) Appl. No.: 14/304,997

(22) Filed: Jun. 16, 2014

(65) Prior Publication Data
US 2014/0379984 A1    Dec. 25, 2014

(30) Foreign Application Priority Data
Jun. 19, 2013 (TW) .............................. 102121766 A

(51) Int. Cl.
G06F 12/00   (2006.01)
G06F 3/06    (2006.01)
G06F 9/52    (2006.01)

(52) U.S. Cl.
CPC .............. G06F 3/0689 (2013.01); G06F 3/061 (2013.01); G06F 3/0659 (2013.01); G06F 3/0653 (2013.01); G06F 9/52 (2013.01)

(58) Field of Classification Search
None
See application file for complete search history.

(56) References Cited

U.S. PATENT DOCUMENTS

| | | | |
|---|---|---|---|
| 7,873,790 B2* | 1/2011 | Bouchou | G06F 3/061 711/118 |
| 7,949,849 B2 | 5/2011 | Lowe et al. | |
| 2005/0240641 A1* | 10/2005 | Kimura | G06F 12/0253 |
| 2006/0005197 A1 | 1/2006 | Saha et al. | |
| 2009/0271412 A1 | 10/2009 | Lacapra et al. | |
| 2012/0260068 A1 | 10/2012 | Henry et al. | |

FOREIGN PATENT DOCUMENTS

| | | |
|---|---|---|
| CN | 1716186 A | 1/2006 |
| CN | 101566925 A | 10/2009 |
| CN | 101661378 B | 9/2011 |
| TW | 201007489 A | 2/2010 |
| TW | 201241644 A | 10/2012 |

\* cited by examiner

Primary Examiner — Brian Peugh
(74) Attorney, Agent, or Firm — CKC & Partners Co., Ltd.

(57) ABSTRACT

An anti-timeout method applied to a data processing system is provided. The data processing system includes a disk module. The anti-timeout method includes following steps: setting a total volume of the disk module into a plurality of virtual disk volumes, wherein each of the virtual disk volumes includes an instruction temporary storing queue for temporarily storing operating instructions corresponding to each virtual disk volume; selecting one of the instruction temporary storing queues and processing the operating instructions stored in the selected instruction temporary storing queue; calculating a continuous operating value of continuous processing of the selected instruction temporary storing queue; and selecting another one of the instruction temporary storing queues if the continuous operating value exceeds a predetermined threshold value.

10 Claims, 4 Drawing Sheets

ANTI-TIMEOUT METHOD AND DATA PROCESSING SYSTEM

CROSS-REFERENCE TO RELATED APPLICATION

This application claims the priority benefit of Taiwan application serial No. 102121766, filed on Jun. 19, 2013. The entirety of the above-mentioned patent application is hereby incorporated by reference herein and made a part of specification.

BACKGROUND OF THE INVENTION

1. Field of the Invention

The disclosure relates to a control method of a data processing system and, more particularly, to an anti-timeout control method applied in a data processing process.

2. Description of the Related Art

A data processing system for processing digital files, such as redundant array of independent disks (RAID), a data center or a computer system is widely used in a personal purpose, in an enterprise or a cloud server. The data processing system can read corresponding data from a disk module or write files to specific positions of the disk module according a read or write command of a user or the system.

When the user or the system continuously gives out multiple read/write commands, if one operating instruction (which may read a large amount of data) takes up too much time, other operating instructions may wait for timeout and abnormal situations may occur. For example, the other subsequent operating instructions are lost, an instruction temporary storing, queue overflows or an operating instruction with a high priority cannot be executed immediately.

BRIEF SUMMARY OF THE INVENTION

An anti-timeout method applied to a data processing system is provided. The data processing system includes a disk module. The anti-timeout method includes following steps: setting a total volume of the disk module into a plurality of virtual disk volumes, wherein each of the virtual disk volumes includes an instruction temporary storing queue to temporarily store operating instructions corresponding to each of the virtual disk volumes; selecting one of the instruction temporary storing queues and processing the operating instructions stored in the selected instruction temporary storing queue; calculating a continuous operating value of the operating instructions corresponding to the selected instruction temporary storing queue; and selecting another one of the instruction temporary storing queues if the continuous operating value exceeds a predetermined threshold value.

A data processing system includes a disk module and a control module. The disk module includes a disk control unit to set a total volume of the disk module into a plurality of virtual disk volumes. Each of the virtual disk volumes includes an instruction temporary storing queue to temporarily store operating instructions corresponding to each of the virtual disk volumes. The control module includes a processing unit and an anti-timeout unit. The processing unit selects the instruction temporary storing queue in sequence and processes the operating instructions of the selected instruction temporary storing queue. The anti-timeout unit calculates a continuous operating value of continuous processing of the processing unit corresponding to the selected instruction temporary storing queue and makes the processing unit select another one of the instruction temporary storing queues if the continuous operating value exceeds a predetermined threshold value.

These and other features, aspects and advantages of the present disclosure will become better understood with regard to the following description, appended claims, and accompanying drawings.

DETAILED DESCRIPTION OF THE EMBODIMENTS

An anti-timeout method and a data processing system are illustrated with relating figures hereinafter.

Figure 1:
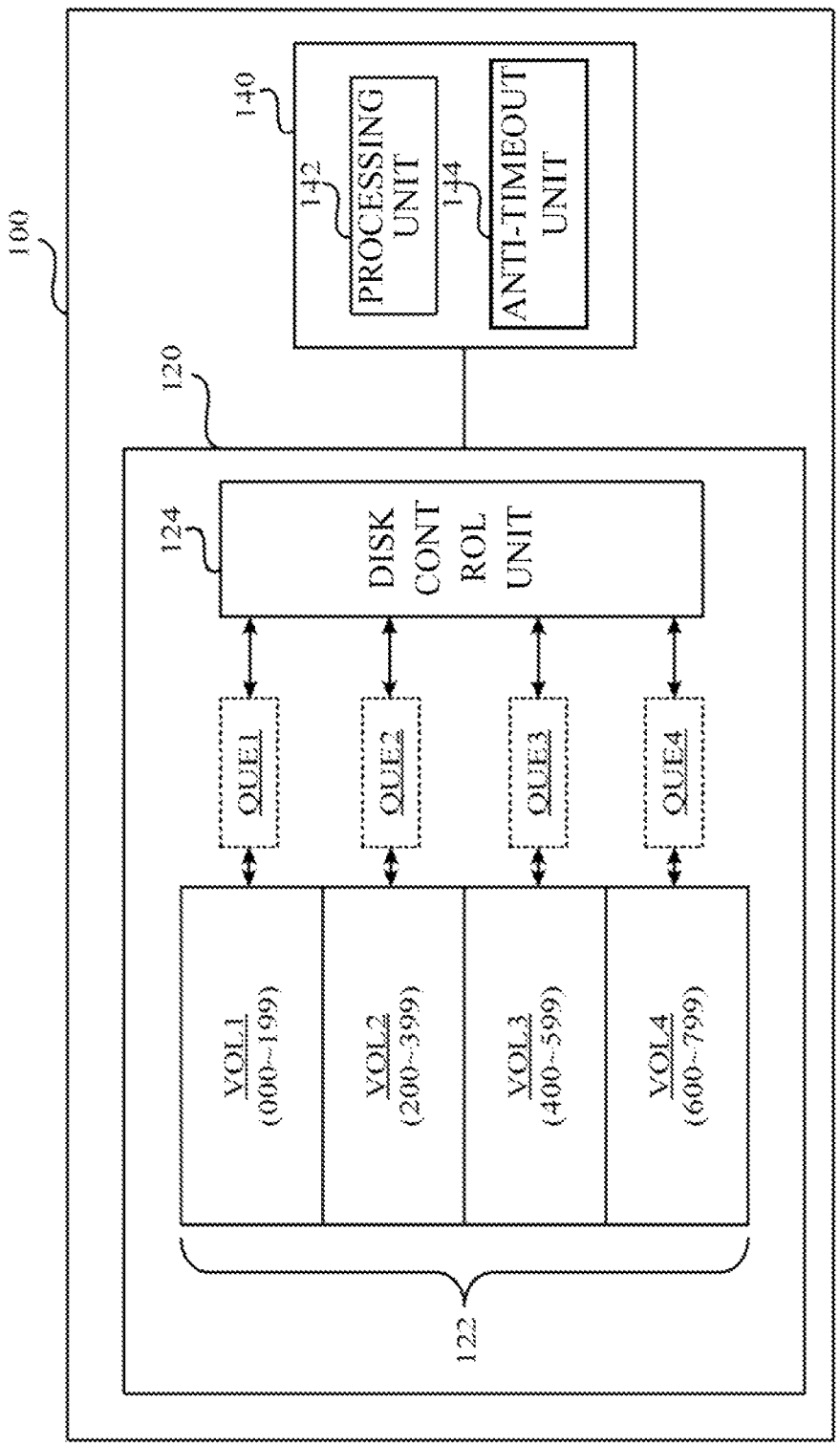
FIG. 1 is a schematic diagram showing a data processing system in an embodiment.

FIG. 1 is a schematic diagram showing a data processing system 100 in an embodiment. As shown in FIG. 1, the data processing system 100 includes to disk module 120 and a control module 140. The data processing system 100 may be redundant array of independent disks (RAID), a data center, a computer system or other data processing and storing devices.

In the embodiment, the disk module 120 includes a storing element 122 and a disk control unit 124. The disk control unit 124 sets a total volume of the storing element 122 of the disk module 120 into a plurality of virtual disk volumes.

For example, the disk control unit 124 sets the total volume of the storing element 122 to four virtual disk volumes VOL1, VOL2, VOL3 and VOL4 in sequence, and adjacent sectors are in one group, which is not limited herein. For example, the first two hundred sectors (000 to 199) of the storing element 122 are set as the virtual disk volume VOL1 (the sectors may be set via partition or program definition), and the second two hundred sectors (200 to 399) of the storing element 122 are set as another virtual disk volume VOL2, and the rest can be deduced by analogy.

The setting number of the virtual disk volumes may be any natural number larger than 2, and it can be adjusted according to the total volume of the storing element 122, the size of the files or the processing capability of the disk control unit 124. The size of each of the virtual disk volumes VOL1 to VOL4 may be different and can be adjusted independently.

As shown in FIG. 1, the control module 140 is electrically connected to the disk module 120. In the embodiment, the control module 140 includes a processing unit 142 and an anti-timeout unit 144.

The control module 140 can send operating instructions to the virtual disk volumes VOL1, VOL2, VOL3 and VOL4, respectively, via the disk control unit 124 to read, write, delete, move or modify the data. The virtual disk volumes VOL1, VOL2, VOL3 and VOL4 respectively include corresponding instruction temporary storing queues QUE1, QUE2, QUE3 and QUE4 to temporarily store the operating instructions.

The instruction temporary storing queues QUE1, QUE2, QUE3 and QUE4 may not be independently set as shown in FIG. 1, and they may be achieved via software, firmware or hardware and integrated to the storing element 122 or the disk control unit 124.

The contents and features of the operating instructions received by the virtual disk volumes VOL1 to VOL4 are different. For example, some operating instructions may relate to reading operations which have timeliness, small size, high frequency or are necessary in system operation, and need an immediate and rapid response. Some operating instructions may relate to reading operations of media video files in a large size, which takes up much more time but has lower importance. Some operating instructions may relate to writing operations of downloaded files which has a long file length and a large size. Some operating instructions may relate to conversion operations of media files which has a long file length and can be dynamically accessed. As stated above, the processing contents (large size, small size, system necessary setting contents or other file contents) and the features (high timeliness or low timeliness) of the operating instructions are different.

In the embodiment, the processing unit 142 of the control module 140 sequentially selects one of the instruction temporary storing queues QUE1 to QUE4 corresponding to the virtual disk volumes VOL1 to VOL4 and processes the operating instructions stored in the selected instruction temporary storing queue QUE1, QUE2, QUE3 or QUE4.

The data processing system 100 first processes the operating instruction generated first, which is a first in first out (FIFO) principle. However, in order to prevent a specific virtual disk volume from taking up too much time (for example, all of the operating instructions generated first are received by one same virtual disk volume), the data processing system 100 further has an anti-timeout principle additionally.

At a perfect state, the data processing system 100 executes the operating instructions corresponding to the virtual disk volumes VOL1 to VOL4 (the instruction temporary storing queues QUE1 to QUE4) equally. The anti-timeout unit 144 of the data processing system 100 prevents a specific virtual disk volume from taking up too much time, and avoids that the operating instructions received by other virtual disk volumes waits for timeout and abnormal situations occur. For example, the operating instructions received by the virtual disk volumes which wait for timeout may be lost, an instruction temporary storing queue overflows (which means the total value of the waiting operating instructions exceeds the total volume of the instruction temporary storing queue) or an operating instruction with a high priority cannot be executed immediately.

In the embodiment, the anti-time out unit 144 calculates a continuous operating value of the processing unit 142 corresponding to the selected instruction temporary storing queue QUE1 to QUE4. If the continuous operating value exceeds a predetermined threshold value, the processing unit 142 selects another instruction temporary storing queue.

Figure 2:
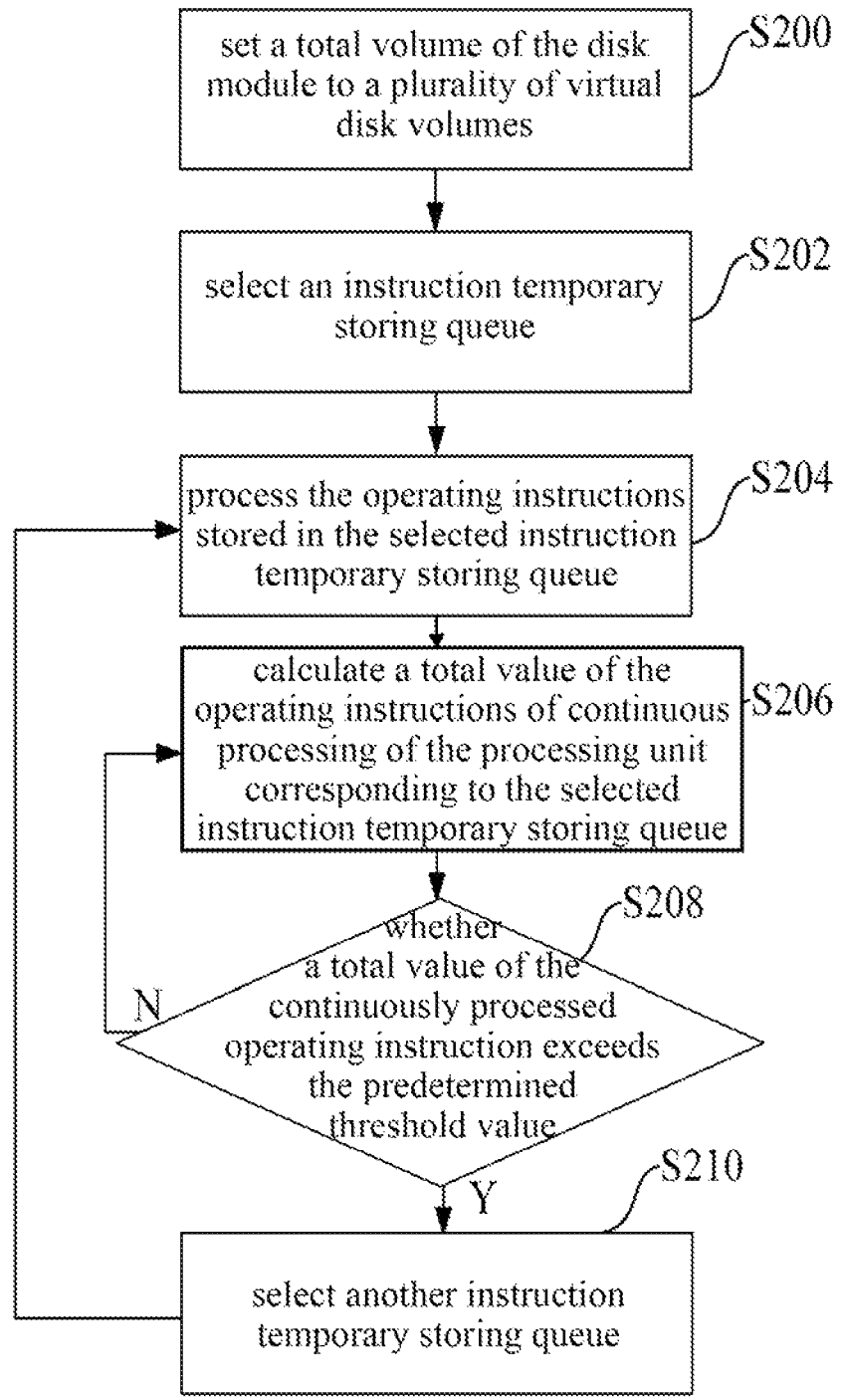
FIG. 2 is a flow chart showing an anti-timeout method in a first embodiment.

FIG. 2 is a flow chart showing an anti-timeout method in a first embodiment. The anti-timeout method is applied to the data processing system 100 shown in FIG. 1 or other similar storing devices or systems, which is not limited herein.

As shown in FIG. 2, in step S200, the total volume of the disk module (such as the disk module 120 in FIG. 1) is set to a plurality of virtual disk volumes (such as the virtual disk volumes VOL1 to VOL4 in FIG. 1). Each of the virtual disk volumes includes an instruction temporary storing queue (such as the instruction temporary storing queues QUE1 to QUE4 in FIG. 1) to temporarily store the operating instructions corresponding to the virtual disk volumes VOL1 to VOL4.

In step S202, one of the instruction temporary storing queues QUE1 to QUE4 is selected.

When the step S202 is executed for the first time, a first non-empty queue of the instruction temporary storing queues QUE1 to QUE4 is selected in sequence. For example, if the instruction temporary storing queue QUE1 is not an empty queue (which means it includes waiting operating instructions), the instruction temporary storing queue QUE1 is selected. If the instruction temporary storing queue QUE1 is an empty queue, it is determined that whether the next instruction temporary storing queue QUE2 is an empty queue, and the rest can be deduced by analogy until the next non-empty instruction temporary storing queue is selected.

For example, the instruction temporary storing queue QUE1 includes five waiting operating instructions, the instruction temporary storing queue QUE2 does not include waiting operating instructions, the instruction temporary storing queue QUE3 includes ten waiting operating instruction, and the instruction temporary storing queue QUE4 includes two waiting operating instructions. In step S202, the instruction temporary storing queue QUE1 is selected.

Then, in step S204, the operating instructions stored in the selected instruction temporary storing queue QUE1 are processed, so as to operate the virtual disk volume VOL1.

When the operating instructions stored in the selected instruction temporary storing queue are processed in step S204, the anti-timeout method further executes step S206 to calculate a total value of the operating instructions continuously processed in the selected instruction temporary storing queue (which is the instruction temporary storing queue QUE1 corresponding to the virtual disk volumes VOL1 in the embodiment).

Then, in step S208, it is determined that whether the total value of the continuously processed operating instructions exceeds the predetermined threshold value. For example, the predetermined threshold value is set as 3, which means only three operating instructions are permitted to be continuously processed in one single instruction temporary storing queue (that is one single virtual disk volume).

In the step S208, if the total value of the continuously processed operating instructions does not exceed the predetermined threshold value (which means the total value of the continuously processed operating instructions is three or less than three), the step S206 is executed again to process the selected instruction temporary storing queue.

In the step S208, if the total value of the continuously processed operating instructions exceeds the predetermined threshold value (which means the total value of the continuously processed operating instructions is larger than three), step S210 is executed to select another instruction temporary storing queue. In the step S210, the next non-empty instruction temporary storing queue is selected (which means the instruction temporary storing queues after the original selected instruction temporary storing queue are searched in sequence, and the closest non-empty instruction temporary storing queue is selected). In the embodiment, the instruction temporary storing queue QUE2 is an empty queue and the instruction temporary storing queue QUE3 is a non-empty queue. Thus, the instruction temporary storing queue QUE3 is selected in the step S210. Then, the step S204 is executed again to process the operating instructions stored in the selected instruction temporary storing queue (which is the instruction temporary storing queue QUE3).

As stated above, the anti-timeout unit 144 calculates the total value of the continuously processed operating instructions. When the total value of the operating instructions exceeds the predetermined threshold value, the instruction temporary storing queue corresponding to another virtual disk volume is processed. Thus, it can avoid that a specific virtual disk volume takes up too much time of the processing unit 142.

Figure 3:
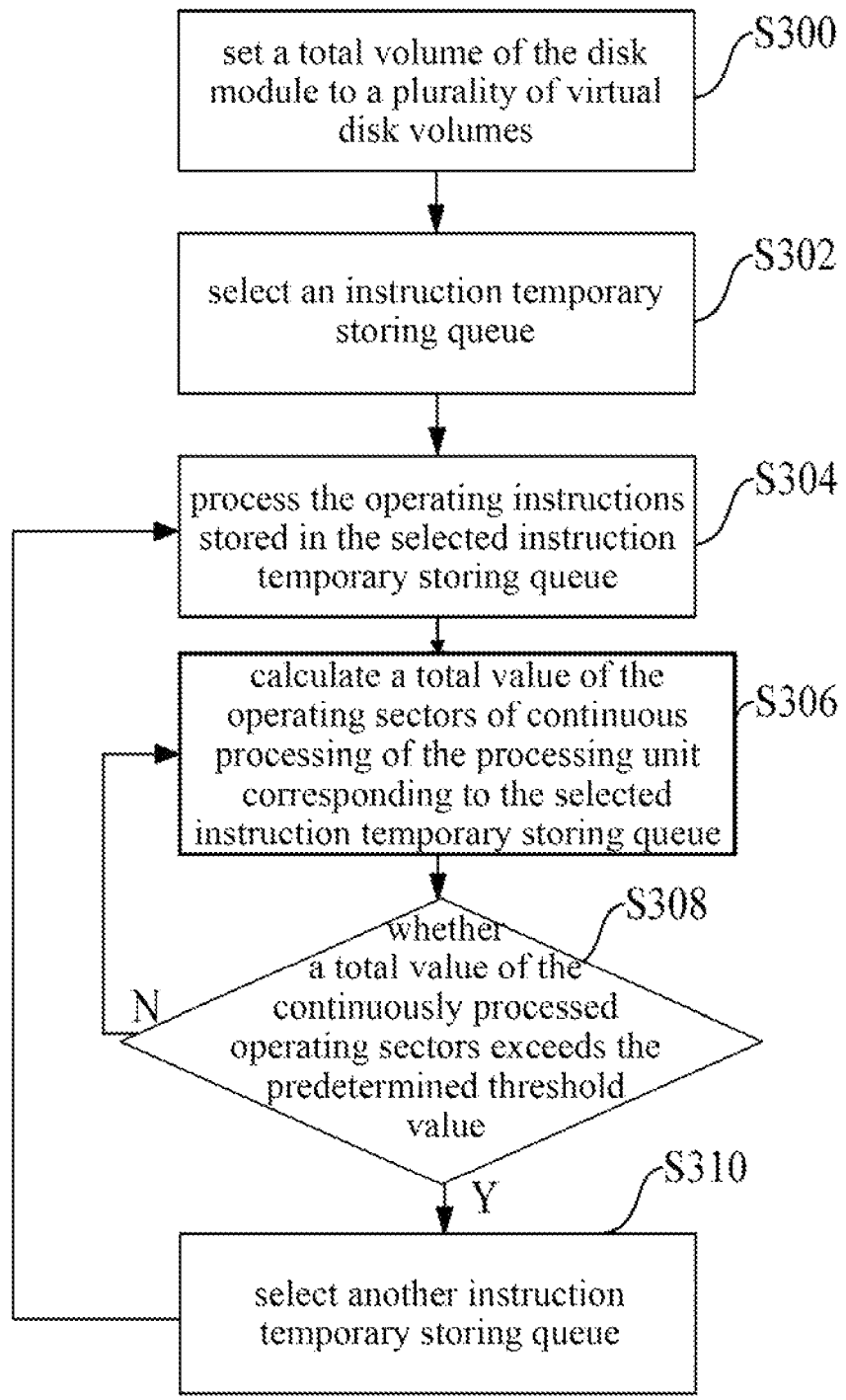
FIG. 3 is a flow chart showing an anti-timeout method in a second embodiment.

Moreover, the anti-timeout unit 144 determines whether the continuous processing is timeout in the anti-timeout method is not limited by according to the total value of the operating instructions. Please refer to FIG. 3. FIG. 3 is a flow chart showing an anti-timeout method in a second embodiment.

As shown in FIG. 3, the anti-timeout method first executes step S300 to set the total volume of the disk module to a plurality of the virtual disk volumes. Then, in step S302, an instruction temporary storing queue is selected.

In step S304, the operating instructions stored in the selected instruction temporary storing queue are processed to operate the virtual disk volumes.

The difference between the first embodiment in FIG. 2 and the second embodiment in FIG. 3 is that the anti-timeout method executes step S306 to calculate a total value of operating sectors continuously processed by the selected instruction temporary storing queue.

Then, the anti-timeout method executes step S308 to determine whether the total value of the continuously processed operating sectors exceeds the predetermined threshold value. For example, the predetermined threshold value may be set as 50, which means only 50 sectors are permitted to be continuously processed by one single instruction temporary storing queue (that is one single virtual disk volume).

In the step S308, if the total value of the continuously processed operating sectors does not exceed the predetermined threshold value (which means the total value of the continuously processed operating sectors is fifty or less than fitly), the step S306 is executed again to process the selected instruction temporary storing queue.

In the step S308, if the total value of the continuously processed operating sectors exceeds the predetermined threshold value (which means the total value of the continuously processed operating sectors is larger than fifty), step S310 is executed to select another instruction temporary storing queue (which means the next non-empty instruction temporary storing queue is selected). Then, the step S304 is executed again to process the operating instructions stored in the next selected instruction temporary storing queue. Other details of the anti-timeout method shown in FIG. 3 are similar with those in the previous embodiments shown in FIG. 1 and FIG. 2, which is omitted herein.

As stated above, the anti-timeout unit 144 calculates the total value of the continuously processed operating sectors. When the total value of the operating sectors exceeds the predetermined threshold value, the instruction temporary storing queue corresponding to another virtual disk volume is processed.

Figure 4:
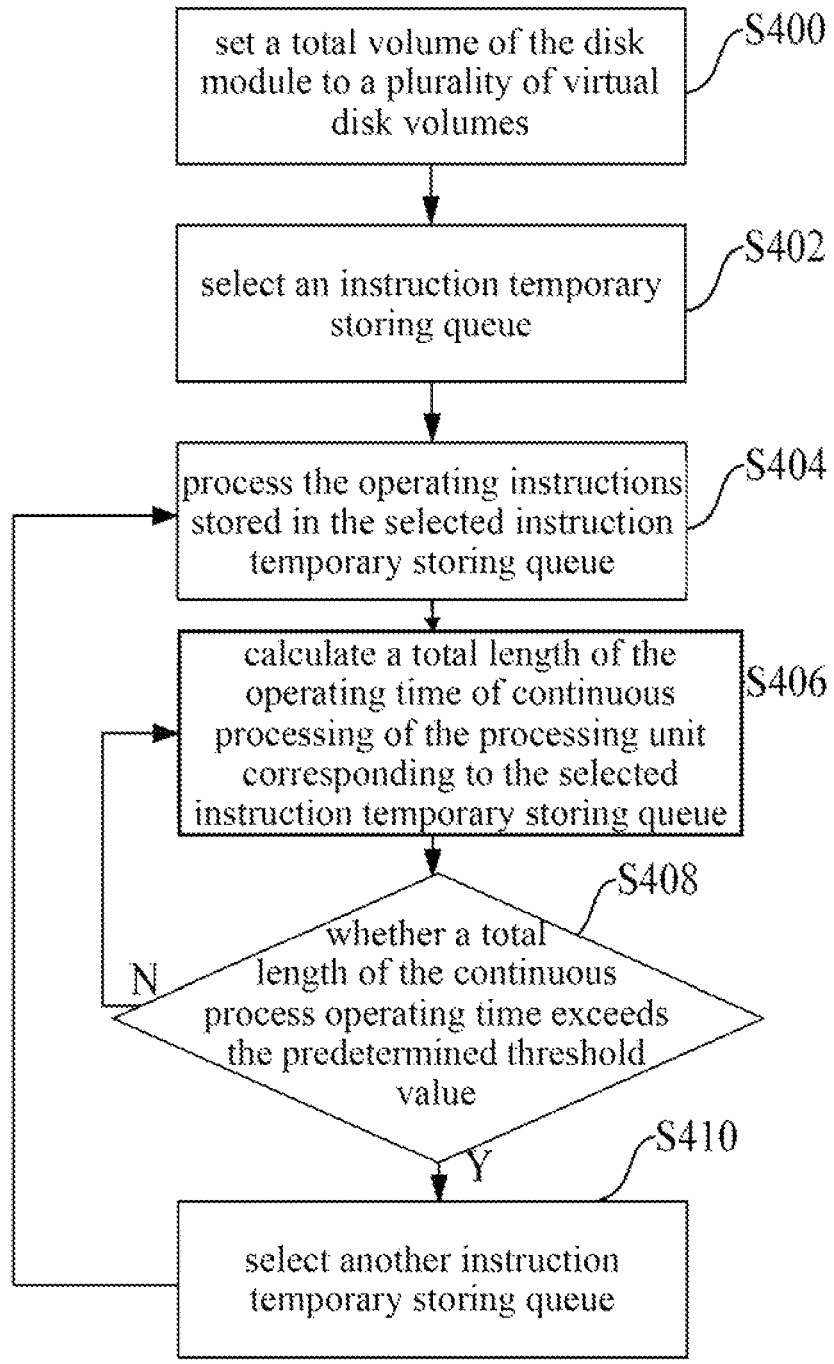
FIG. 4 is a flow chart showing an anti-timeout method in a third embodiment.

FIG. 4 is a flow chart showing an anti-timeout method in a third embodiment. The difference between the embodiment in FIG. 4 and the previous embodiments is that in step S406 of the anti-timeout method, a total length of operating time of continuous processing by the selected instruction temporary storing queue is calculated. In step S408 it is determined that whether the total length of operating time of continuous processing exceeds the predetermined threshold value. If yes, step S410 is executed to select another instruction temporary storing queue.

Other details of the anti-timeout method shown in FIG. 4 are similar with those in the previous embodiments shown in FIG. 1 and FIG. 2, which is omitted herein.

In sum, the anti-timeout method and the data processing system set the total volume of the disk module to a plurality of the virtual disk volumes, and calculate the continuous operating value. When the continuous operating value exceeds a predetermined threshold, the instruction temporary storing queue corresponding to another virtual disk volume is processed. Thus, processing states of the virtual disk volumes can be balanced and abnormal situations due to the operating instructions waiting for timeout can be avoided.

Although the present disclosure has been described in considerable detail with reference to certain preferred embodiments thereof, the disclosure is not for limiting the scope. Persons having ordinary skill in the art may make various modifications and changes without departing from the scope. Therefore, the scope of the appended claims should not be limited to the description of the preferred embodiments described above.

What is claimed is:

1. An anti-timeout method, applied to a data processing system, wherein the data processing system includes a disk module, the anti-timeout method comprising following steps:
    setting a total volume of the disk module into a plurality of virtual disk volumes, wherein each of the virtual disk volumes includes an instruction temporary storing queue to temporarily store operating instructions corresponding to each of the virtual disk volumes;
    selecting one of the instruction temporary storing queues and processing the operating instructions stored in the selected instruction temporary storing queue;
    calculating a continuous operating value of the operating instructions corresponding to the selected instruction temporary storing queue; and
    selecting another one of the instruction temporary storing queues if the continuous operating value exceeds a predetermined threshold value.

2. The anti-timeout method according to claim 1, wherein the disk module includes a storing element, the storing element includes a plurality of sectors, and the step of setting the total volume of the disk module to the virtual disk volumes includes:
    setting a total volume of the storing element to the virtual disk volumes, wherein the N adjacent sectors are in a group and N is a positive integer.

3. The anti-timeout method according to claim 1, wherein the step of selecting one of the instruction temporary storing queues includes:
    selecting a first non-empty instruction temporary storing queue from the instruction temporary storing queues in sequence.

4. The anti-timeout method according to claim 1, wherein in the step of calculating the continuous operating value, the continuous operating value is a total value of the operating instructions, a total value of operating sectors or a total length of operating time of the continuous processing of the selected instruction temporary storing queue.

5. The anti-timeout method according to claim 1, wherein the step of selecting another one of the instruction temporary storing queues if the continuous operating value exceeds the predetermined threshold value includes:
    selecting another non-empty instruction temporary storing queue in sequence from the instruction temporary storing queues.

6. A data processing system, comprising:
a disk module including a disk control unit to set a total volume of the disk module into a plurality of virtual disk volumes, wherein each of the virtual disk volumes includes an instruction temporary storing queue to temporarily store operating instructions corresponding to each of the virtual disk volumes; and
a control module including:
- a processing unit selecting the instruction temporary storing queue in sequence and processing the operating instructions of the selected instruction temporary storing queue; and
- an anti-timeout unit calculating a continuous operating value of continuous processing of the processing unit corresponding to the selected instruction temporary storing queue and making the processing unit select another one of the instruction temporary storing queues if the continuous operating value exceeds a predetermined threshold value.

7. The data processing system according to claim 6, wherein the disk module further includes a storing element, the storing element includes a plurality of sectors, and the disk control unit sets a total volume of the storing element to the virtual disk volumes, wherein the N adjacent sectors are in a group and N is a positive integer.

8. The data processing system according to claim 6, wherein the processing unit selects a first non-empty instruction temporary storing queue from the instruction temporary storing queues in sequence.

9. The data processing system according to claim 6, wherein the anti-timeout unit calculates a total value of the operating instructions, a total value of operating sectors or a total length of operating time of the continuous processing of the selected instruction temporary storing queue to obtain the continuous operating value.

10. The data processing system according to claim 6, wherein when the continuous operating value exceeds the predetermined threshold value, the anti-timeout unit informs the processing unit to select another non-empty instruction temporary storing queue in sequence from the instruction temporary storing queues.

* * * * *